United States Patent [19]

Reed, Jr.

[11] 3,886,191

[45] May 27, 1975

[54] CARBOXY-TERMINATED COPOLYMERS OF ISOPRENE AND VINYL FERROCENE

[75] Inventor: Samuel F. Reed, Jr., Huntsville, Ala.

[73] Assignee: The United States of America as represented by the Secretary of the Army, Washington, D.C.

[22] Filed: July 8, 1970

[21] Appl. No.: 56,015

[52] U.S. Cl. .......................... 260/439 CY; 260/82.1
[51] Int. Cl............................................... C08d 3/10
[58] Field of Search ..................... 260/82.1, 439 CY

[56] References Cited
UNITED STATES PATENTS

| | | | |
|---|---|---|---|
| 2,877,212 | 3/1959 | Seligman | 260/77.5 |
| 3,427,295 | 2/1969 | Reed | 260/86.1 |
| 3,518,241 | 6/1970 | Duling et al. | 260/89.5 |
| 3,562,236 | 2/1971 | O'Alelio | 260/86.1 R X |
| 3,586,552 | 6/1971 | Potts et al. | 149/20 X |
| 3,718,633 | 2/1973 | Baldwin et al. | 149/19 X |

FOREIGN PATENTS OR APPLICATIONS

| | | | |
|---|---|---|---|
| 601,243 | 7/1960 | Canada | 260/439 CY |

OTHER PUBLICATIONS

Arimoto et al., *J. Am. Chem. Soc.*, 77, 6295 (1955).

Bamford et al., *Transactions of the Faraday Society*, 56, 932–942 (1960).

Baldwin et al., *Chem. Abs.*, 67, No. 82412f (1967).

*Primary Examiner*—Benjamin R. Padgett
*Assistant Examiner*—E. A. Miller
*Attorney, Agent, or Firm*—Robert P. Gibson; Nathan Edelberg; Jack W. Voigt

[57] ABSTRACT

Copolymers of vinyl ferrocene (VF) and isoprene are disclosed along with preparative procedures therefor. The copolymers are produced in an organic solvent when polymerization is initiated by a carboxy-containing azo compound, such as, 4,4'-azobis(4-cyanovaleric acid), thereby forming a copolymer of vinyl ferrocene and isoprene. The copolymers are useful in propellant formulations as a binder where high burning rates are desired.

1 Claim, No Drawings

CARBOXY-TERMINATED COPOLYMERS OF ISOPRENE AND VINYL FERROCENE

BACKGROUND OF THE INVENTION

Considerable literature exists on the preparation of polyisoprene with carboxy-terminal groups prepared by both anionic and free radical initiators.

The preparation of vinyl ferrocene may be accomplished by the method disclosed by F. S. Arimoto and A. C. Haven, J. Am. Chem. Soc., 77, 6295 (1955).

Well known in the propellant field is the fact that the burning rate of many solid propellants can be increased by the introduction of certain iron-containing additives. Many ferrocene derivatives have been utilized as additives for this purpose, usually in the form of liquids which also serve as plasticizing agents. In the liquid state the ferrocenes display the inherent disadvantages characteristic of liquid additives, such as loss by evaporation, migration, etc., and, consequently, the propellant systems suffer, particularly on the long term storage.

Thus, a need exists for a modified form of ferrocene additive which form is not subject to being lost by evaporation or migration from a stored propellant composition.

An object of this invention is to combine the ferrocene additive with the binder being utilized in the propellant system.

Another object is to combine a ferrocene derivative and a binder material via a polymerization technique into a serviceable prepolymer suitable for propellant mixing and curing.

A specific object of this invention is to copolymerize a binder material and a catalyst material to provide a liquid copolymer which is capable of undergoing a cure reaction when used in a propellant composition to form a rubber-like binder material having a burning rate catalyst agent as an integral part thereof.

SUMMARY OF THE INVENTION

Vinyl ferrocene is copolymerized with isoprene in an inert organic solvent after the polymerization reaction is initiated by a carboxycontaining azo compound, such as, 4,4'-azobis(4-cyanovaleric acid) (AMCV). The liquid copolymer is characterized by its molecular weight which is in the range of from about 1,000 to about 10,000, its carboxy-end group content from about 0.5 weight percent to about 9 weight percent, and its iron content from about 0.5 weight percent to about 15 weight percent. The liquid copolymer is capable of undergoing a cure to a final rubberlike state.

DESCRIPTION OF THE PREFERRED EMBODIMENT

The copolymer formed by reaction of isoprene with vinyl ferrocene is useful as a combination binder and burning rate catalyst for solid propellant compositions. The liquid copolymer is characterized by its preferred molecular weight range from about 1,000 to about 10,000, its preferred carboxy-end group content from about 0.5 weight percent to about 9 weight percent, and its iron content from about 0.5 weight percent to about 15 weight percent. The liquid copolymer of isoprene and vinyl ferrocene is produced by a procedure as described by the descriptive technique set forth below as Example I. Table I below sets forth the experimental data on preparation of isoprene-VF copolymers. Table II below sets forth the physical property data for isoprene-VF copolymers produced with the concentrations set forth in Table I.

The isoprene-VF mole ratios may vary from approximately 100:1 to about 1:1. The organic solvents wherein copolymerizations are conducted may be toluene or dioxane. Polymerization temperatures may conveniently be maintained in the range of 60°–80°C. Reaction times may vary over the range of 24–120 hours; however, a reaction time in the range of about 72 hours is preferred.

Copolymers having molecular weights ranging from about 1,000 to about 10,000, carboxy-end group contents of from about 0.5 to about 9 weight percent of the copolymer, and an iron content from about 0.5 weight percent to about 15 weight percent of the copolymer are easily obtained by varying the reaction conditions and concentrations of reactants and initiators. Other representative carboxy-containing azo compounds such as 3,3'-azobis(3-cyanobutyric acid) and 2,2'-azobis(2-cyanopropionic acid) may be employed as initiators for the polymerizations of this invention.

EXAMPLE I

Procedure for Polymerization of Isoprene and Vinyl Ferrocene

To a glass high-pressure reactor (aerosol tube) are introduced 30 ml. of dioxane, 1.0g (0.0047 mole) VF, 19.0 g. (0.279 mole) isoprene, and 2.65 g. (0.0086 mole) 4,4'-azobis(4-cyanovaleric acid). The reactor is attached to a vacuum line and deaerated by three alternate freeze-thaw cycles. The reactor is removed from the vacuum line and placed in an oil bath at 66°–67°C. Heating is continued for a period of 72 hours. After cooling, the reactor is vented, the solvent removed by evaporation and the copolymer reprecipitated by dissolving in ether followed by the addition of methanol. After decanting the solvents, copolymer is stripped of excess solvents on a rotatory evaporator and finally dried at 70°–75°C. under reduced pressure (1 mm) for a period of 25 hours. The yield of copolymer is 9.8 g. (49%). Evaporation of the decanted solvents gave an additional 3.0 g. of the copolymer containing the low molecular weight copolymer and impurities. The liquid copolymer (methanol insolubles) is characterized by its molecular weight (3300), carboxy-end group content (2.91 weight percent) and elemental analysis (percent Fe-0.91%).

TABLE I

Experimental Data on Preparation of Isoprene-VF Copolymers

| No. | Isoprene | Solvent-Dioxane VF | Mole Ratio Isoprene/VF | Temp. 66–67°C AMCV (mmole) | Time – 72 hrs. Weight Copolymer (g.) | Yield % |
|---|---|---|---|---|---|---|
| 1. | 19.0 g. (0.279 mole) | 1.0 g. (0.00467 mole) | 95/5 | 8.6 | 9.8 | 49 |
| 2. | 17.0 g. (0.25 mole) | 3.0 g. (0.014 mole) | 85/15 | 7.9 | 9.8 | 49 |
| 3. | 15.0 g. (0.22 mole) | 5.0 g. (0.0333 mole) | 75/25 | 7.3 | 10.3 | 51 |

TABLE II

Physical Property Data for Isoprene-VF Copolymers

| No. | Molecular Weight | Weight % $CO_2H$* Found/Calc'd. | Percent Fe** Found/Calc'd. |
|---|---|---|---|
| 1. | 3300 | 2.71/2.73 | 0.91/1.31 |
| 2. | 2200 | 2.38/4.08 | 3.38/3.43 |
| 3. | 2200 | 2.21 | 5.2/6.56 |

*Calculated $CO_2H$ weight % made on the basis of two $CO_2H$ groups per chain for the molecular weight values reported.
**Calculated Fe content made on the basis of the ratio of comonomers initially charged into the reactor.

The copolymers of this invention may be used as the binder-catalyst for a solid propellant composition. The copolymer may be used in the propellant composition in an amount from about 5 weight percent to about 30 weight percent. The remaining propellant ingredients exclusive of processing aids (such as lecithin) and trace amount of other additives (e.g., stabilizing, ballistic, special curative, and the like) may be comprised of a plasticizer such as isodecyl pelargonate, a metal fuel such as aluminum, and an inorganic oxidizer such as ammonium perchlorate.

An example of a propellant composition using the copolymers of this invention is set forth under Example II below.

EXAMPLE II

| Ingredient | Weight Percent |
|---|---|
| Isoprene/Vinyl Ferrocene Copolymer binder | 10.0 |
| Isodecyl pelargonate plasticizer | 10.0 |
| Aluminum powder | 10.0 |
| Ammonium perchlorate | 70.0 |

The burning rate for the propellant formulation of Example II compared with a standard containing only isoprene, as binder, is higher by about 20 percent. The propellant formulation of Example II does not require an additional burning rate catalyst, and the formulation may be varied to incorporate a higher binder content and a higher iron content. The burning rate of the propellant increases as the iron content increases. The iron content may also be controlled by the amount of vinyl ferrocene copolymerized with isoprene as well as the amount of copolymer selected for use in the formulations. Those skilled in the art will recognize that the other propellant ingredients may be varied to include metal additives (e.g., aluminum powder or other powdered metals used in the art) in amounts from about 5 to about 20 weight percent, inorganic oxidizer such as, ammonium perchlorate from about 10 to about 72 weight percent. Other plasticizers may be used with the copolymers of this invention. Among the important plasticizers are nonvolatile organic liquids or low melting solids, especially the phthalic, adipate, and sebacate esters, and aryl phosphate esters. Plasticizer content is determined by the desirable properties required for a propellant formulation. Generally, plasticizer amount from about 5 to about 30 weight percent is the range meeting most requirements. special processing aids such as lecithin and trace amount of additives known in the art for their specific contributions to the ballistic, castibility, and storage properties of the propellant may be added to the propellant formulation.

I claim:

1. The carboxy terminated-copolymers of isoprene and vinyl ferrocene prepared by the method comprising reacting vinyl ferrocene and a suitable polymerization initiator in an inert organic solvent with isoprene at a reaction temperature and for a reaction time period sufficient for said reaction to take place after which solvent removal is effected and said copolymers are dried at a suitable drying temperature while under reduced pressure; said suitable polymerization initiator being 4,4'-azobis(4-cyanovaleric acid); said inert organic solvent being selected from dioxane and toluene; said reaction temperature being in the range of about 60°C to about 80°C; said reaction time being from about 24 hours to about 120 hours; said drying is accomplished at a suitable temperature in the range of about 70°C to about 75°C and said reduced pressure is in the range of about 1 millimeter; said reacting isoprene and vinyl ferrocene in mole ratios from approximately 100:1 to 1:1 to form said copolymers characterized by a molecular weight in the range from about 1000 to about 10,000, carboxy-end group content of about 0.5 weight percent to about 9 weight percent, and an iron content of about 0.5 weight percent to about 15 weight percent.

* * * * *